UNITED STATES PATENT OFFICE.

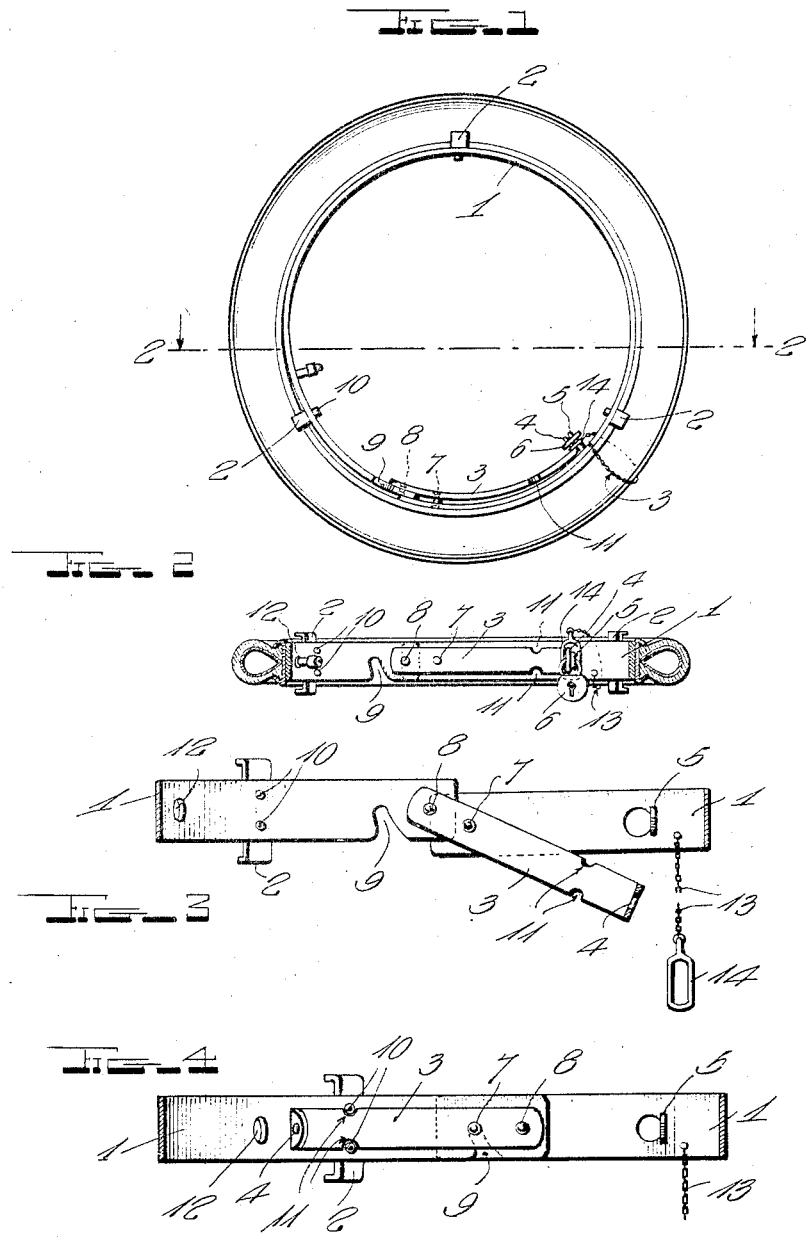

WILBUR M. DACE, OF RUSHVILLE, ILLINOIS.

RIM AND TIRE CARRIER.

1,381,972. Specification of Letters Patent. Patented June 21, 1921.

Application filed August 18, 1919. Serial No. 318,250.

*To all whom it may concern:*

Be it known that I, WILBUR M. DACE, a citizen of the United States, residing at Rushville, in the county of Schuyler and State of Illinois, have invented certain new and useful Improvements in Rim and Tire Carriers; and I do declare the following to be a full, clear, and exact description of the invention, such as will enable others skilled in the art to which it appertains to make and use the same.

This invention relates generally to motor vehicle appliances, but more particularly to rim and tire carriers to be used in connection with motor vehicles.

The primary object of the invention is to provide a band which is intended to be supported upon a motor vehicle to hold a tire casing or a demountable rim carrying a tire casing thereupon, the device being capable of being contracted when it is desired to remove the tire casing or demountable rim therefrom, and being provided with means whereby it may be locked in expanded position so that the tire casing or demountable rim cannot be removed from the device by unauthorized persons.

Another object of the invention is to provide a device of this class which will be extremely simple, strong, durable and inexpensive in construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawing forming a part of this specification and in which similar reference characters designate like parts throughout the several views, Figure 1 is a side elevation of a rim and tire carrier constructed in accordance with this invention and showing a demountable rim carrying a tire casing mounted upon the device.

Fig. 2 is a sectional view taken substantially on the plane indicated by the line 2—2 of Fig. 1, showing the device in locked position.

Fig. 3 is a similar view showing the lever in the act of being swung so as to move the device to contracted position, and Fig. 4 is a similar view showing the device in locked contracted position.

The preferred form of the invention comprises a split circular band 1 which is provided with means for holding a tire casing or a demountable rim carrying a tire casing thereon, this means being shown in the form of a number of cross bars 2 secured at their intermediate portions to the outer side of the band and having their ends turned outwardly.

Pivoted at spaced points to the two ends of the split band 1 is a lever 3, the pivots of which are disposed near one end of the lever. The ends of the split band 1 are preferably disposed in overlapping relation when the band is in expanded position, but it is to be understood that the connections with the lever may be such that the ends of the band may be in abutting relation when the same is expanded. The lever 3 is curved longitudinally to conform to the curvature of the band 1 and extends longitudinally with respect thereto in one direction to hold said band in expanded position. The lever is capable of being swung laterally until it extends in the opposite direction and longitudinally with respect to the band.

The free end of the lever 3 is upturned and apertured as at 4 to form a hasp member adapted to aline with a hasp member 5 carried by the band 1 when said lever is disposed in the proper position to hold the band expanded. The hasp member 5 is preferably formed by stamping a tongue inwardly from the band and aperturing this tongue. When alined, the hasp members 4 and 5 are adapted to receive a padlock 6 which obviously locks the lever 3 against movement so that the band cannot be contracted.

The spaced pivots of the lever 3 are designated by the numerals 7 and 8, the pivot 7 extending through the intermediate portion of the lever and that end of the band 1 which carries the hasp member 5 while the pivot 8 extends through the end of the lever opposite the hasp member 4 and the other end of the band. The last mentioned end of the rim is provided with a notch 9 in one edge thereof at the proper position so as to receive the portion of the pivot 7 disposed between the inner side of the lever 3 and band 1 when the lever is swung to the position for holding the band contracted. This is necessary in order to allow the lever to extend longitudinally with respect to the band when said rim is in its contracted position.

When lever 3 is disposed in the proper position so as to hold the band 1 contracted, it is held in this position by a pair of spaced projections 10 arranged on the inner side of the band and engaging notches 11 formed in the opposite edges of the lever. These projections 10 may be the heads of the rivets which serve to hold one of the cross bars 2 to the outer side of the band.

In order to provide for the reception of the inflating valve of the tire, the band 1 is provided with an opening 12.

Secured at one end to the band 1 at a point adjacent the hasp member 5 is a flexible element or chain 13, the other end of which carries an elongated link 14 capable of being inserted around the hasp members 4 and 5 when alined and being maintained in this position with respect to the hasp members by the aforesaid padlock 6.

The band 1 is designed to be attached in any suitable manner at the rear end or the side of a motor vehicle, but as this forms no part of the present invention, no attaching means is shown.

The device is intended to carry a demountable rim having a tire casing thereon, and in placing the demountable rim carrying the tire casing upon the split band, the latter is contracted by moving the lever 3 to the position shown in Fig. 4 of the drawing. After this has been done and the outturned ends of the cross bars 2 are disposed adjacent the edges of the demountable rim, the lever 3 is swung transversely of the split band 1 to the position shown in Fig. 2. This expands the split band so that the outturned edges of the cross bars 2 extend beyond the edges of the demountable rim and prevent the latter from being moved transversely off of the split band. With the lever 3 disposed in the last mentioned position, the hasp members 4 and 5 will be alined and the padlock 6 may then be inserted in place, and unauthorized persons cannot remove the demountable rim carrying the tire casing from the split band.

In case a tire casing is to be placed upon the split band without first mounting the tire casing upon a demountable rim, this may be done in the manner above described, but the chain 13 is extended around the tire casing and the link 14 is inserted upon the hasp members 4 and 5 before the padlock 6 is applied. With the chain 13 disposed around the tire casing, the latter is locked so that it cannot be taken away by unauthorized persons should it be elastic enough to be stretched over the outturned ends of the cross bars 2. By having the band 1 flat and comparatively wide, it will engage the inner sides of the tire casing which is disposed upon it without being first mounted upon a demountable rim and thereby prevent water from gaining access to the interior of the tire casing.

Various changes in form, proportion, and in the minor details of construction may be resorted to without departing from the spirit of the invention as set forth in the claims.

What is claimed is:

1. A device of the class described comprising a split band having means for holding a tire casing or a rim carrying a tire casing thereon and having a slot in one edge thereof adjacent one of its ends, a lever pivoted at one end to this end of said split band and pivoted at its intermediate portion to the other end of the latter, said lever extending longitudinally of said split band in one direction when holding the latter in expanded position and longitudinally of said split band in the other direction when holding the same in contracted position, the last mentioned pivot of said lever being received in said notch when the lever is extending in the direction to hold said split band contracted, and means for locking said lever in either of its positions.

2. A device of the class described comprising a split band having means for holding a tire casing or a rim carrying a tire casing thereon, a lever pivoted at spaced points to the ends of said split band, said lever extending in one direction to hold said split band expanded and in the other direction to hold the latter contracted, hasp members carried by said lever and said split band and adapted to be disposed in alinement when said lever is in its position for holding said split band expanded, a flexible element connected at one end to said split band and adapted to be passed around the same and the casing carried thereby, a link carried by the other end of said element and disposed over said alined hasp members, and a padlock engaged with said alined hasp members.

3. A rack for demountable rims or tire casings comprising a split band having overlapped ends and provided with casing or rim holding means, a longitudinally curved lever contacting at one of its ends with the inner peripheral face of the innermost end of the band, said lever being spaced from the inner peripheral face of the outer end of said band a distance equal to the thickness of said band, radial pivots connecting said lever with the ends of said band, one of said pivots extending across the space between said lever and said outer end of the band, said inner end of the band having a notch to receive this pivot when the lever is swung to band contracting position and said inner end of the band thereby positioned in the aforesaid space, and means for holding said lever in band expanding position.

4. A rack for demountable rims or tire casings comprising a split band having overlapped ends and provided with casing or rim holding means, a longitudinally curved lever contacting at one of its ends with the inner peripheral face of the innermost end of the band, said lever being spaced from the inner peripheral face of the outer end of said band a distance equal to the thickness of said band, radial pivots connecting said lever with the ends of said band, one of said pivots extending across the space between said lever and said outer end of the band, said inner end of the band being receivable in said space when said lever is thrown into band contracting position, and means for holding said lever in band expanding position.

In testimony whereof I have hereunto set my hand.

WILBUR M. DACE.